Aug. 24, 1965    H. J. BASS    3,202,038
PUSH-TYPE BLIND FASTENER, REMOVABLE, REUSABLE, PROVIDED WITH
SELF-LOCKING, SELF-RETAINING, SELF-SECURING MEANS
Filed Oct. 14, 1963    2 Sheets-Sheet 2
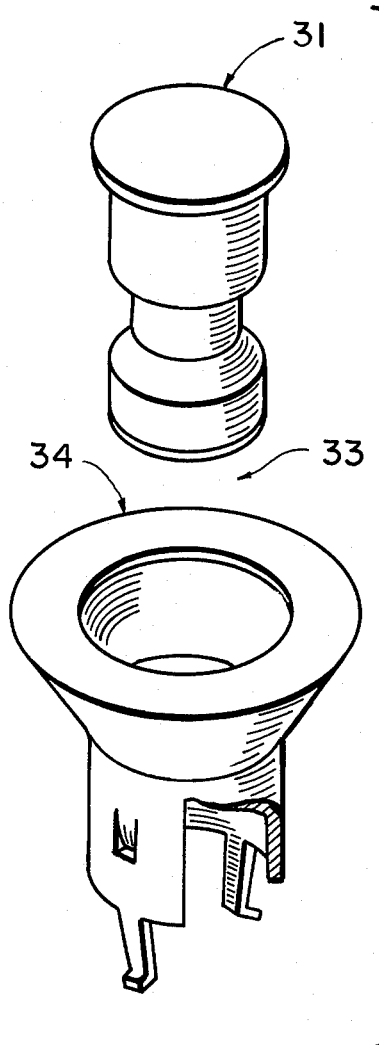
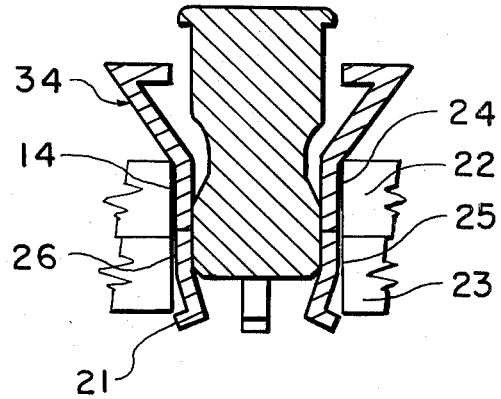
FIG. 6
FIG. 7
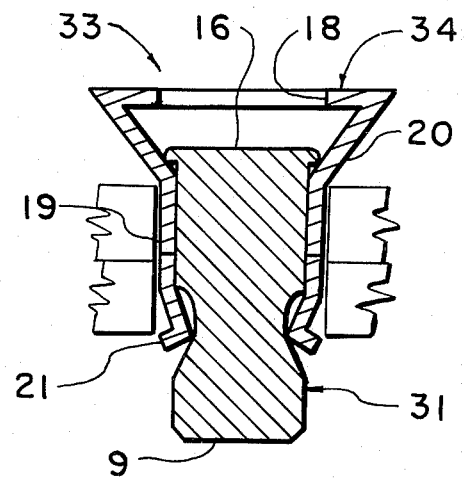
FIG. 8
INVENTOR.
BY Henry James Bass

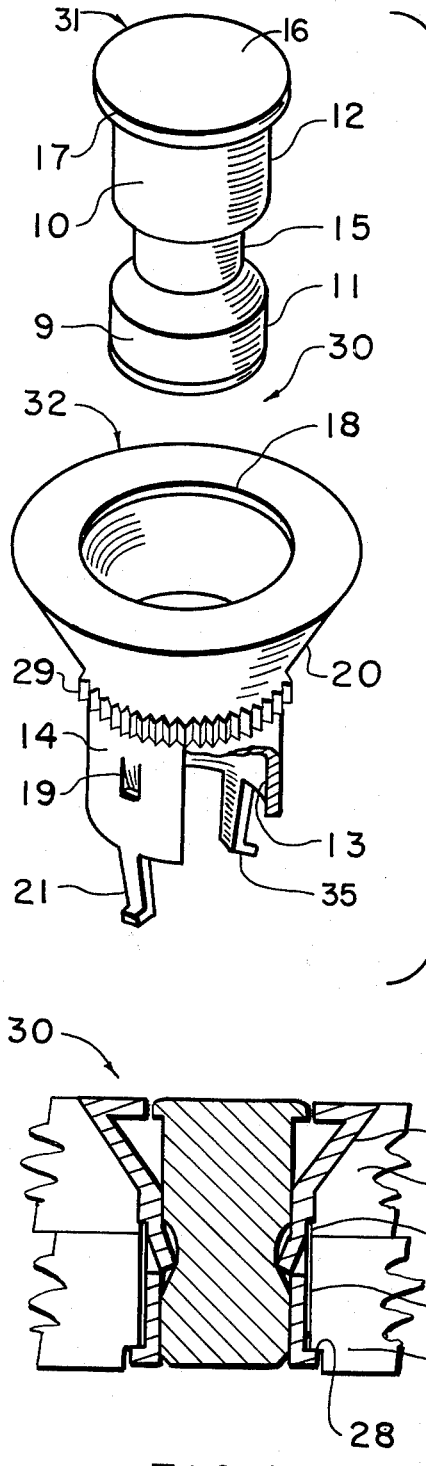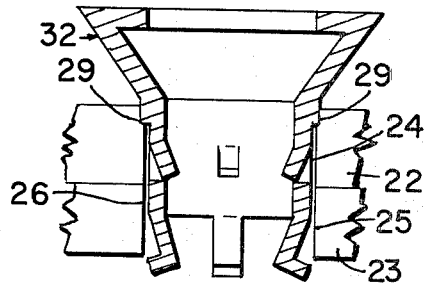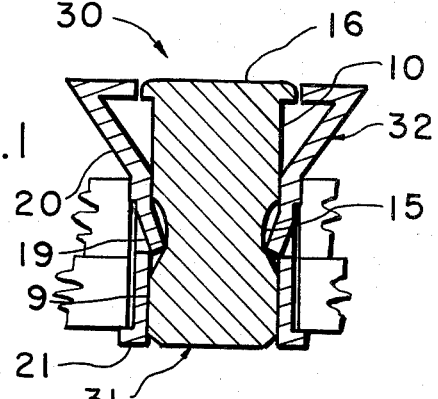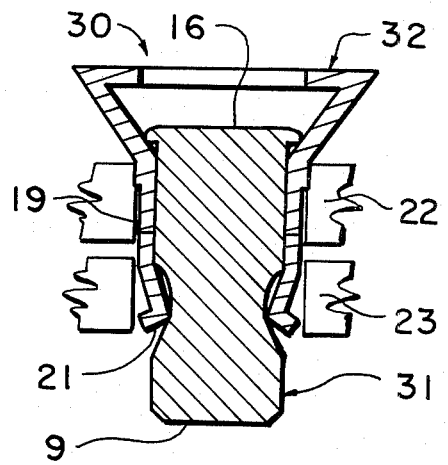

United States Patent Office 3,202,038
Patented Aug. 24, 1965

3,202,038
PUSH-TYPE BLIND FASTENER, REMOVABLE, REUSABLE, PROVIDED WITH SELF-LOCKING, SELF-RETAINING, SELF-SECURING MEANS
Henry James Bass, 360 La Perle Place, Costa Mesa, Calif.
Filed Oct. 14, 1963, Ser. No. 316,023
4 Claims. (Cl. 85—83)

This invention relates to fasteners commonly referred to as "blind" bolts and more particularly to the self-locking, self-retaining, push-type "blind" bolt, adapted to be installed or removed by hand-pushed operations without the use of tools.

This invention is characterized by a pre-assembled push bolt and headed sleeve used in fastening access panels or doors which provide quick access for the maintenance and repair of components housed within.

A particular object of this invention is to provide a push-type blind fastener capable of being installed having both ends thereof flush with the surfaces of the work piece to provide clearance for the free movement of adjacent parts or wires relatively close to said flush ends.

Another object of this invention is to provide a push-type blind fastener that is self-locking and self-retaining.

Another object of this invention is to provide a push-type blind fastener capable of being reset by hand for reuse.

Another object of this invention is to provide a push-type blind fastener which is self-securing.

Other objects and features of this invention will be readily apparent to those skilled in the art from the following specifications and related drawings.

The following drawings illustrate the invention embodied herein. Like numbers refers to corresponding similar parts throughout the various figures in the drawings:

FIG. 1 is an exploded perspective view of the self-retaining type of fastener assembly showing the two parts of the fastener assembly with a portion broken away to show the construction.

FIG. 2 is an axial cross section of the headed sleeve imbedded into the accessible panel.

FIG. 3 is an axial cross section of the fastener assembly in the installed position.

FIG. 4 is an axial cross section of the fastener assembly in the removal position.

FIG. 5 is an axial cross section of the fastener assembly in the installed position in an application where both ends thereof are flush with the work.

FIG. 6 is an exploded perspective view of a non-self-retaining type fastener assembly with a portion broken away to show the construction.

FIG. 7 is an axial cross section of the nonself-retaining type fastener assembly in the pre-installed position.

FIG. 8 is an axial cross section of the nonself-retaining type fastener assembly in the removal position.

Referring to FIG. 1, the self-retaining type fastener assembly 30 of this invention comprises of the push bolt 31 and the headed sleeve 32. The push bolt 31 is provided with a base 9 and a shank 10 with their equal diameters 11 and 12 respectively, that are slightly smaller than the inside body diameter 13 of the headed sleeve 32 allowing entry and fit therein.

An annular locking and releasing groove 15 is located at a distance from the top surface of the head 16 of push bolt 31 substantially equal to the distance between the extremities of tabs 19 and the top surface of the countersink head 20 of sleeve 32, adapted to provide clearance space for the resilient locking and securing tabs 19 and resilient prongs 21 of the headed sleeve 32. The push bolt 31 has a pan head 16 (though other kinds or types of heads may be provided) with the diameter 17 slightly smaller than the inside head diameter 18 of the headed sleeve 32 allowing free entry therein. Diameter 17 of the push bolt 31 is larger than the inside body diameter 13 of the headed sleeve 32 to prevent push bolt head 17 from passing all the way through headed sleeve 32. The headed sleeve 32 has a countersink head 20 (though other kinds or types of heads may be provided) and a cylindrical hollow body 14 from which extends a plurality of L shaped (though other kinds of configurations may be used) resilient prongs 21 (four being illustrated though less or more prongs may be provided) that are slightly bent inwardly towards the longitudinal axis permitting their free entry into aligned mounting holes. The prongs 21 of the headed sleeve 32 are adapted to be flared radially outwardly by the base 9 of the push bolt 31. Said prongs 21 are extending inwardly towards the axis of the sleeve 32 and have radially extending projections at the terminal tips 35 thereof. Said tips 35 extend radially outwardly no further than the outer surface of the body 14 of sleeve 32 when in the inwardly extending (unfastened) position. Said tips extend beyond said body 14 when in the flared radially outwardly (fastened) position. When in said (fastened) position the distance between said tips 35 and the top surface of the head 20 on sleeve 32 is equal to the overall length of the push bolt 31, such that the respective opposite ends of said bolt 31 and sleeve 32 are flush with one another. Directly above each prong 21 on the hollow body 14 of the headed sleeve 32 is a locking tab 19 (though other types of locking means such as dimples or indentures may be used) slightly bent inwardly towards the longitudinal axis to extend into the central bore of the sleeve 32. The distance from the extremities of said tabs 19 to the top surface of the countersink head 20 of sleeve 32 is substantially equal to the distance between the groove 15 and the top surface of the head 16 on push bolt 31. Above the locking and securing tabs 19 of the headed sleeve 32, are raised external broaching serrations 29 (though other kinds of retaining means such as knurls or threads may be provided) adapted to provide self-retaining means which may be installed by hand without the use of tools.

Looking at FIG. 2, the accessible panel 22 and the inaccessible panel 23 to be fastened together are provided with aligned mounting holes 24 and 25 respectively, of equal diameters that are slightly larger than the outside diameter 26 of the headed sleeve 32. The external broaching serrations 29 of the headed sleeve 32 is imbedded axially by the thumb of the hand into the mounting hole 24 of the accessible panel 22 providing self-retaining means therein.

As shown in FIG. 3, the fastener assembly 30 is installed from one end thereof without using tools by pushing with a finger of the hand the pan head 16 of the push bolt 31 flush with the countersink head 20 of the headed sleeve 32. The L-shaped prongs 21 of the headed sleeve 32 are flared radially outwardly by the base 9 of the push bolt 31. The recessed, annular, locking and releasing groove 15 of the push bolt 31 provides clearance space for the resilient locking and securing tabs 19 of the headed sleeve 32. Said resilient locking tabs 19 tend to return to their original position (slightly bent inwardly towards the longitudinal axis) and resist the passage of base 9 or shank 10 of the push bolt 31 providing self-locking therein.

Referring to FIG. 4, the pan head 16 of the push bolt 31 is pushed with a finger of the hand until bottoming on the headed sleeve 32. The accessible panel 22, retaining fastener assembly 30, may now be separated from the inaccessible panel 23.

After the separation of the accessible panel 22 from the inaccessible panel 23, the fastener assembly 30 is reset by pushing with a finger of the hand the base 9 of the push bolt 31 past the resilient prongs 21 of the headed sleeve 32 allowing said prongs 21 to return to their original position (slightly bent inwardly towards the longitudinal axis). The resilient locking and securing tabs 19 of the headed sleeve 32 tend to return to their original position (slightly bent inwardly towards the longitudinal axis) and exert a clamping action on the base 9 of push bolt 31 securing same within imbedded headed sleeve 32. The fastener assembly 30 is then ready for installation.

Looking at FIG. 5, the mounting hole 24 in the accessible panel 22 is countersunk 27 and the aligned mounting hole 25 in the inaccessible panel 23 in counterbored 28 so that the ends of the fastener assembly 30 are flush on both sides of the work.

Referring to FIG. 6, the nonself-retaining fastener assembly 33 comprises of the push bolt 31, previously described in FIG. 1, and the headed sleeve 34 which is similar to the headed sleeve 32 in FIG. 1 except without external broaching serrations.

Looking at FIG. 7, the accessible panel 22 and the inaccessible panel 23 to be fastened together are provided with aligned mounting holes 24 and 25 respectively, of equal diameters that are slightly larger than the outside diameter 26 of the headed sleeve 34 allowing free entry and fit therein of prongs 21 and the body 14.

The locked position of the nonself-retaining fastener assembly 33 is identical to the installation of the self-retaining fastener assembly 30 previously described in FIG. 3.

Referring to FIG. 8, the pan head 16 of the push bolt 31 is pushed with a finger of the hand until bottoming on the headed sleeve 34. The fastener assembly 33 is then removed from one end thereof, without using tools, by pulling with the hand the knoblike countersink head 20 or by pulling with a finger of the hand on the inside head diameter 18 of the headed sleeve 34. After the removal of the fastener assembly 33, it is reset for installation by pushing with a finger of the hand the base 9 of the push bolt 31 past the resilient prongs 21 of the headed sleeve 34 (as shown in FIG. 7) allowing said prongs 21 to return to their original position (slightly bent inwardly towards the longitudinal axis). The resilient locking and securing tabs 19 of the headed sleeve 34 tend to return to their original position (slightly bent inwardly towards the longitudinal axis) and exert a clamping action upon the base 9 of push bolt 31 securing same within the headed sleeve 34 and preventing disengagement thereof.

1 claim:

1. A reusable self-locking self-retaining self-securing blind fastener adapted for passage into aligned apertures in the front and rear panels of the workpiece which is capable of being installed entirely by hand-pushed operation with both respective opposite ends thereof flush and which is capable of being unfastened by hand-pushed operation comprising, in combination, a sleeve into which is slidably engaged a push bolt with a single annular locking and releasing groove, said sleeve having a countersink head at one end thereof from which extends a cylindrical hollow body portion with a central bore throuhout its length, the diameter of said bore in said countersink head being greater than the diameter of said bore in said body portion, directly under said countersink head being provided external self-retaining means capable of being imbedded by hand into said front panel, below said self-retaining means being provided resilient locking and securing tabs slightly bent inwardly towards the axis of said sleeve and extending into said central bore, said tabs being located on said body portion to correspond and cooperate with said groove on said bolt to provide self-locking therein, the end opposite said countersink head having resilient prong means extending inwardly towards the axis of said sleeve and having radially extending projections at the terminal tips thereof, said tips extending radially outwardly no further than the outer surface of said body portion when in the inwardly extending (unfastened) position, said tips extending beyond said outer surface when in the flared radially outwardly (fastened) position, and the distance between said tips to the top surface of said countersink head being equal to the overall length of said bolt, said bolt having an enlarged head at one end thereof of a lesser diameter than said bore in said countersink head but of a greater diameter than said bore in said body portion, said bolt having a cylindrical shank portion extending from said enlarged head of slightly lesser diameter than said bore in said body portion to allow free slideable engagement therein, said bolt shank being provided with said groove at a distance from said enlarged head substantially equal to the distance between the extremities of said tabs and the top surface of said countersink head to receive said tabs for self-locking therein when the top surface of said bolt head is substantially coplanar with the top surface of said countersink head, said groove being adapted upon further insertion by a finger of the hand into said bore in said body portion to release said prong means and unfasten said panels, said fastener being reset for reuse by pushing said bolt into said sleeve in the opposite direction past said prong means allowing said prong means to return to said (unfastened) position, said locking and securing tabs exerting clamping action upon said bolt securing said bolt therein and preventing disengagement thereof.

2. A reusable self-locking self-retaining self-securing blind fastener capable of being installed entirely by hand-pushed operation with both ends thereof flush with the workpiece and capable of being unfastened by hand-pushed operation, said fastener being adapted for passage into properly prepared aligned apertures in the front and rear panels of the workpiece comprising, in combination, a sleeve into which is slideably engaged a push bolt with a single annular locking and releasing groove, said sleeve having a countersink head at one end thereof from which extends a cylindrical hollow body portion with a central bore throughout its length, the diameter of said bore in said countersink head being greater than the diameter of said bore in said body portion, directly under said countersink head being provided external self-retaining means capable of being imbedded by hand into said front panel, below said self-retaining means being provided resilient locking and securing tabs slightly bent inwardly towards the axis of said sleeve and extending into said central bore, said tabs being located on said body portion to correspond and cooperate with said groove on said bolt to provide self-locking therein, the end opposite said countersink head having resilient prong means extending inwardly towards the axis of said sleeve and having radially extending projections at the terminal tips thereof, said tips extending radially outwardly no further than the outer surface of said body portion when in the inwardly extending (unfastened) position, said tips extending beyond said outer surface when in the flared radially outwardly (fastened) position and the distance between said tips to the top surface of said countersink head being equal to the overall length of said bolt, said bolt having an enlarged head at one end thereof of a lesser diameter than said bore in said countersink head but of a greater diameter than said bore in said body portion, said bolt having a cylindrical shank portion extending from said enlarged head of slightly lesser diameter than said bore in said body portion to allow free slideable engagement therein, said bolt shank being provided with said groove at a distance from said enlarged head substantially equal to the distance between the extremities of said tabs and top surface of said countersink head, said sleeve being inserted into said apertures and imbedded by hand into said front panel for retention, said bolt being pushed by a finer of the hand into said sleeve until the top surface of said bolt head is substantially coplanar with the top surface of said countersink head, said bolt radially flaring outwardly said tips to engage said rear panel and cooperate with said countersink head to draw said front and rear panels together with said ends flush to said panels, said groove receiving said tabs and providing self-locking therein, said bolt being further pushed by a finger of the hand into said central bore allowing said groove to release said prong means and unfasten said panels, said fastener being reset for reuse by pushing said bolt into said sleeve in the opposite direction past said prong means to allow said prong means to return to said (unfastened) position, said locking and securing tabs exerting clamping action upon said bolt securing said bolt therein and preventing the disengagement thereof.

3. A reusable self-locking self-securing blind fastener adapted for passage into aligned apertures in the front and rear panels of the workpiece which is capable of being installed entirely by hand-pushed operation with both respective opposite ends thereof flush and which is capable of being unfastened by hand-pushed operation comprising, in combination, a sleeve into which is slideably engaged a push bolt with a single annular locking and releasing groove, said sleeve having a countersink head at one end thereof from which extends a cylindrical hollow body portion with a central bore throughout its length, the diameter of said bore in said countersink head being greater than the diameter of said bore in said body portion, below said countersink head being provided resilient locking and securing tabs slightly bent inwardly towards the axis of said sleeve and extending into said central bore, said tabs being located on said body portion to correspond and cooperate with said groove on said bolt to provide self-locking therein, the end opposite said countersink head having resilient prong means extending inwardly towards the axis of said sleeve and having radially extending projections at the terminal tips thereof, said tips extending radially outwardly no further than the outer surface of said body portion when in the inwardly extending (unfastened) position, said tips extending beyond said outer surface when in the flared radially outwardly (fastened) position, and the distance between said tips to the top surface of said countersink head being equal to the overall length of said bolt, said bolt having an enlarged head at one end thereof of a lesser diameter than said bore in said countersink head but of greater diameter than said bore in said body portion, said bolt having a cylindrical shank portion extending from said enlarged head of slightly lesser diameter than said bore in said body portion to allow free slideable engagement therein, said bolt shank being provided with said groove at a distance from said enlarged head substantially equal to the distance between the extremities of said tabs and the top surface of said countersink head to receive said tabs for self-locking therein when the top surface of said bolt head is substantially coplanar with the top surface of said countersink head, said groove being adapted upon further insertion by a finger of the hand into said bore in said body portion to release said prong means and unfasten said panels, said fastener being reset for reuse by pushing said bolt into said sleeve in the opposite direction past said prong means allowing said prong means to return to said (unfastened) position, said locking and securing tabs exerting clamping action upon said bolt securing said bolt therein and preventing disengagement thereof.

4. A reuseable self-locking self-securing blind fastener capable of being installed entirely by hand-pushed operation with both ends thereof flush with the workpiece and capable of being unfastened by hand-pushed operation, said fastener being adapted for passage into properly prepared aligned apertures in the front and rear panels of the workpiece comprising, in combination, a sleeve into which is slideably engaged a push bolt with a single annular locking and releasing groove, said sleeve having a countersink head at one end thereof from which extends a cylindrical hollow body portion with a central bore throughout its length, the diameter of said bore in said countersink head being greater than the diameter of said bore in said body portion, below said countersink head being provided resilient locking and securing tabs slightly bent inwardly towards the axis of said sleeve and extending into said central bore, said tabs being located on said body portion to correspond and cooperate with said groove on said bolt to provide self-locking therein, the end opposite said countersink head having resilient prong means extending inwardly towards the axis of said sleeve and having radially extending projections at the terminal tips thereof, said tips extending radially outwardly no further than the outer surface of said body portion when in the inwardly extending (unfastened) position, said tips extending beyond said outer surface when in the flared radially outwardly (fastened) position and the distance between said tips to the top surface of said countersink head being equal to the overall length of said bolt, said bolt having an enlarged head at one end thereof of a lesser diameter than said bore in said countersink head but of a greater diameter than said bore in said body portion, said bolt having a cylindrical shank portion extending from said enlarged head of slightly lesser diameter than said bore in said body portion to allow free slideable engagement therein, said bolt shank being provided with said groove at a distance from said enlarged head substantially equal to the distance between the extremities of said tabs and the top surface of said countersink head, said fastener being inserted into said apertures and said bolt being pushed by a finger of the hand into said sleeve until the top surface of said bolt head is substantially coplanar with the top surface of said countersink head, said bolt radially flaring outwardly said tips to engage said rear panel and cooperate with said countersink head to draw said front and rear panels together with said ends flush to said panels, said groove receiving said tabs and providing self-locking therein, said bolt being further pushed by a finger of the hand into said central bore allowing said groove to release said prong means and unfasten said panels, said fastener being reset for reuse by pushing said bolt into said sleeve in the opposite direction past said prong means to allow said prong means to return to said (unfastened) position, said locking and securing tabs exerting clamping action upon said bolt securing said bolt therein and preventing the disengagement thereof.

References Cited by the Examiner

UNITED STATES PATENTS

| 1,940,307 | 12/33 | Keeler | 85—2 |
| 2,340,423 | 2/44 | O'Shaughnessy et al. | 85—40 |
| 2,353,851 | 7/44 | Rosan | 85—2.4 |
| 2,616,328 | 11/52 | Kingsmore | 85—40 |

FOREIGN PATENTS

| 102,750 | 12/37 | Australia. |
| 747,277 | 1/45 | Germany. |
| 960,045 | 3/57 | Germany. |

CARL W. TOMLIN, *Primary Examiner.*

EDWARD C. ALLEN, *Examiner.*